United States Patent [19]

Daly et al.

[11] Patent Number: 4,780,761
[45] Date of Patent: Oct. 25, 1988

[54] DIGITAL IMAGE COMPRESSION AND TRANSMISSION SYSTEM VISUALLY WEIGHTED TRANSFORM COEFFICIENTS

[75] Inventors: Scott J. Daly, W. Henrietta; Majid Rabbani; Cheng-Tie Chen, both of Rochester, all of N.Y.

[73] Assignee: Eastman Kodak Company, Rochester, N.Y.

[21] Appl. No.: 57,413

[22] Filed: Jun. 2, 1987

[51] Int. Cl.[4] ............................................. H04N 7/133
[52] U.S. Cl. ..................................... 358/133; 358/138
[58] Field of Search ................................ 358/133, 138

[56] References Cited

U.S. PATENT DOCUMENTS

| 4,068,265 | 1/1978 | Russell | 358/138 |
|---|---|---|---|
| 4,179,709 | 12/1979 | Workman | 358/133 |
| 4,196,448 | 4/1980 | Whitehouse et al. | 358/135 |
| 4,302,775 | 11/1981 | Widergren et al. | 358/136 |
| 4,394,774 | 7/1983 | Widergren et al. | 382/56 |
| 4,520,391 | 5/1985 | Edgar | 358/133 |
| 4,541,012 | 9/1985 | Tescher | 358/133 |
| 4,644,407 | 2/1987 | Nixon | 358/242 |

OTHER PUBLICATIONS

"A Visual Model Weighted Cosine Transform for Image Compression and Quality Assessment" by N. B. Nill, IEEE Transactions on Communications, vol. COM-33, No. 6, Jun. 1985.

"Perceptual Coding in the Cosine Transform Domain" by N. C. Griswold, Optical Engineering, vol. 19, No. 3, May/Jun. 1980.

"A Visually Weighted Quantization Scheme for Image Bandwidth Compression at Low Data Rates" by Eggerton and Srinath, IEEE Transactions on Communications, vol. COM-34, No. 8, Aug. 1986.

"Scene Adaptive Coder" by Chen and Pratt, IEEE Transactions on Communications, vol. COM-32, No. 3, Mar. 1984.

Primary Examiner—Howard W. Britton
Attorney, Agent, or Firm—Thomas H. Close

[57] ABSTRACT

A system for compressing and transmitting a digital image signal over a limited bandwidth communication channel, transform codes the image values and quantizes the transform coefficients according to a two-dimensional model of the sensitivity of the human visual system. The model of the human visual system is characterized by being less sensitive to diagonally oriented spatial frequencies than to horizontally or vertically oriented spatial frequencies, thereby achieving increased compression of the image.

14 Claims, 10 Drawing Sheets

DIGITAL IMAGE COMPRESSION AND TRANSMISSION SYSTEM VISUALLY WEIGHTED TRANSFORM COEFFICIENTS

RELATED APPLICATIONS

U.S. Ser. No. 057,066; filed June 2, 1987
U.S. Ser. No. 057,404; filed June 2, 1987
U.S. Ser. No. 057,410; filed June 2, 1987
U.S. Ser. No. 057,585; filed June 2, 1987
U.S. Ser. No. 057,595; filed June 2, 1987
U.S. Ser No. 057,596; filed June 2, 1987

TECHNICAL FIELD

The present invention relates to a digital image compression and transmission through limited bandwidth communication channel, and more particularly to digital image compression employing spatial frequency transform coding and visual weighting of the transform coefficients.

BACKGROUND ART

It is well known to employ transform coding of digital images for bandwidth compression prior to transmission over a limited bandwidth communication channel. In a typical prior art digital image compression and transmission system employing transform coding, the digital image is formatted into blocks (e.g. 16×16 pixels) and a spatial frequency transformation such as a discrete cosine transform, DCT, is applied to each block to generate 16×16 blocks of transform coefficients. Theoretical and simulation studies have shown that the DCT is nearly optimum for reducing redundancy of first-order Markov image models. It has been shown to be very close to the Karhunen-Loeve Transform, which is optimal in reducing redundancy, but which does not yield to a straight forward computation like the DCT. Each block of transform coefficients is ordered into a one-dimensional vector such that the average energy of each coefficient generally decreases along the vector. The nonzero transform coefficients are quantized and coded using a minimum redundancy coding scheme such as Huffman coding; run-length coding is used to encode runs of coefficients having zero magnitude. The coded transform coefficients are transmitted over the limited bandwidth channel. See U.S. Pat. No. 4,302,775 issued Nov. 24, 1981 to Widergren et al for an example of such a compression scheme in a a video image compression system.

At the receiver, the image signal is decoded using operations that are the inverse of those employed to encode the digital image. This technique is capable of producing advantageously high image compression ratios, thereby enabling low bit rate transmission of digital images over limited bandwidth communication channels.

It has further been suggested that incorporation of a model of the human visual system in an image compression technique should further improve its performance (See "Visual Model Weighted Cosine Transform for Image Compression and Quality Assessment" by Norman B. Nill IEEE Transactions on Communications, Vol. COM-33, No. 6, June 1985)

It is the object of the present invention to provide an improved image compression technique incorporating a model of the human visual system.

DISCLOSURE OF THE INVENTION

The object of the present invention is achieved in an image compression system of the type described, by accounting in the model of the human visual system for the fact that the human visual system is less sensitive to diagonally oriented spatial frequencies than to horizontally or vertically oriented spatial frequencies. Accordingly, in a system for transmitting a digital image signal over a limited bandwidth communication channel, a transmitter or a transceiver includes means for quantizing the spatial frequency transform coefficients of a digital image in accordance with a two-dimensional model of the sensitivity of the human visual system to spatial frequencies. The model includes the feature that the human visual system is less sensitive to diagonally oriented spatial frequencies than to horizontally or vertically oriented spatial frequencies.

In a preferred embodiment of the invention, the means for quantizing comprises means for normalizing the transform coefficients in accordance with the model of the human visual system, and a uniform quantizer for quantizing the normalized coefficients.

In a system where the spatial frequency transformation is performed on the digital image in blocks or subportions of the image, the two-dimensional model of the human visual system is modified to have constant maximum response to low frequencies, rather than the reduced response at low frequencies in the standard models of the human visual system.

MODES OF CARRYING OUT THE INVENTION

Figure 1:
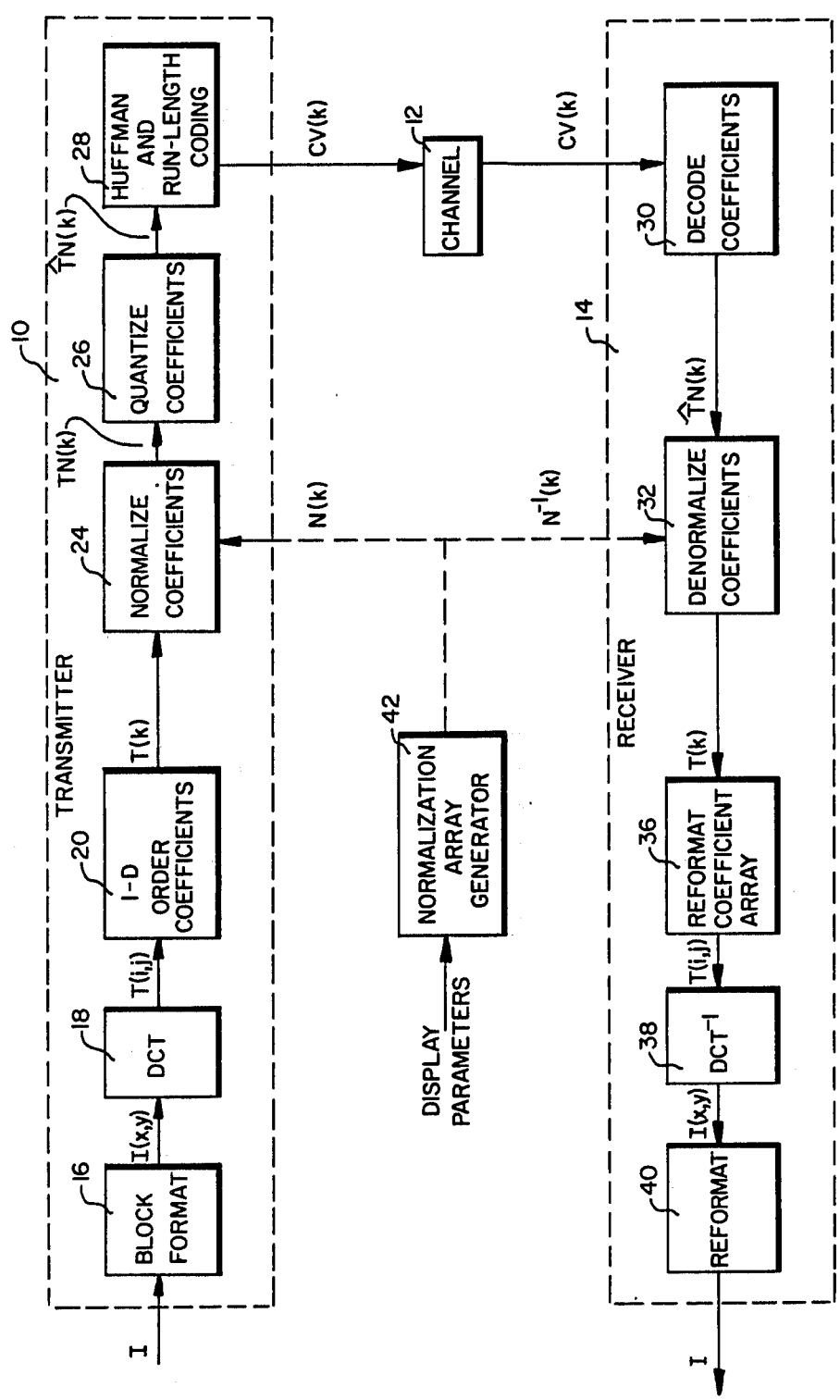
FIG. 1 is a flow diagram showing the system for compressing and transmitting digital images according to the present invention.

A flow diagram of a system for compressing and transmitting a digital image according to the present invention is shown in FIG. 1. A transmitter 10 acquires a digital image from a source (not shown) such as an image sensor, film scanner or a digital image recorder. The digital image comprises for example 512×512 8-bit pixels. The transmitter 10 compresses and encodes the digital image and supplies the encoded digital image signal to a limited bandwidth communication channel 12 such as a standard 3.3 khz bandwidth telephone line. The encoded digital image signal is received from the channel 12 by a receiver 14 that decodes the compressed digital image signal and reconstructs the digital image.

TRANSMITTER 10

The transmitter 10 receives the digital image I and formats (16) the image into blocks I(x,y). The currently preferred block size is 16×16 pixels. A discrete cosine transform is performed (18) on each block to generate the corresponding block T(i,j) of transform coefficients. The transform coefficients for each block are ordered (20) into a one-dimensional array T(k) in order of increasing spatial frequency, for example by employing a zigzag scan along diagonals of a block of coefficients.

Next, the coefficients are normalized (24) in accordance with the sensitivity of the human visual system to spatial frequencies. A normalization array N(k) is generated as described below, and stored in the transmitter 10. The transform coefficients T(k) are normalized by dividing each transform coefficient by its corresponding normalization value as follows:

$$TN(k) = T(k)/N(k) \quad (1)$$

where TN(k) is the normalized transform coefficient value. The normalized coefficients TN(k) are quantized (26) to form quantized coefficients $\hat{T}N(k)$. The quantized coefficients are encoded (28) using a minimum redundancy coding scheme to produce code values CV(k). A presently preferred coding scheme is a Huffman code with run-length coding for strings of zero magnitude coefficients. Since discrete cosine transformation (DCT), and Huffman and run-length coding are well known in the art (see the above reference U.S. Pat. No. 4,302,775), the details of this process will not be discussed further herein. The coded coefficients are transmitted over the channel 12 to receiver 14.

RECEIVER 14

The receiver 14 performs the inverse of the operations performed by the transmitter 10 to recover the digital image. The code values CV(k) are decoded (30) to produce normalized coefficients $\hat{T}N(k)$. The normalized coefficients $\hat{T}N(k)$ are denormalized (32) employing a denormalization array $N^{-1}(k)$ that is the inverse of the normalization array N(k) employed in the transmitter to produce denormalized coefficients T(k). Alternatively, the transform coefficients are denormalized by multiplying by the normalization coefficients.

The one-dimensional string of reconstructed coefficient values T(k) are re-formatted into two-dimensional blocks (36) T(i,j) and the blocks of coefficients are inversely transformed into image values (38) I(x,y). Finally, the blocks of image values are re-formatted (40) into the digital image I.

NORMALIZATION ARRAY GENERATOR 42

Figure 2:
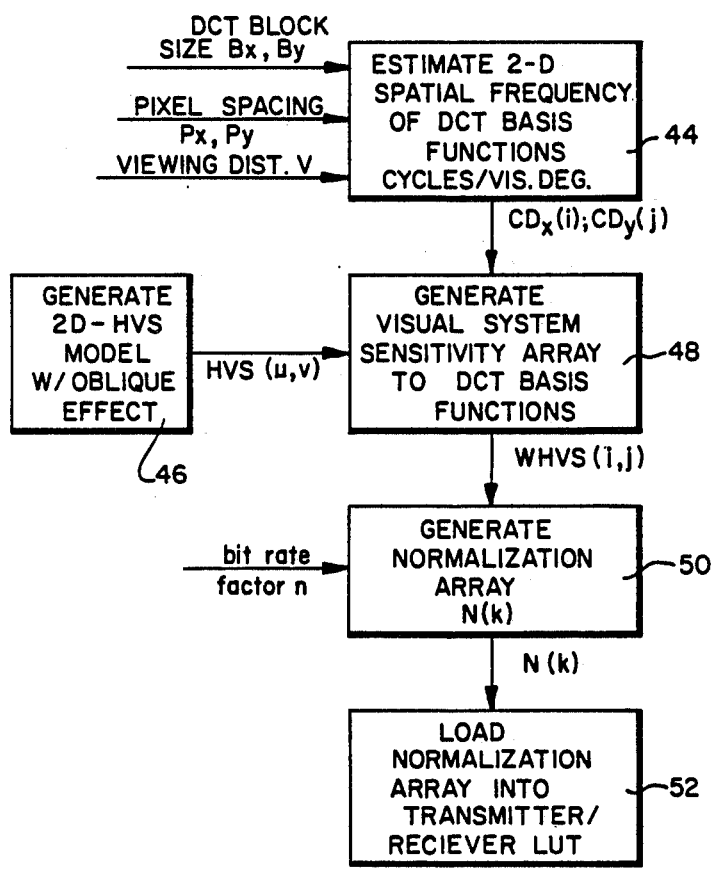
FIG. 2 is a flow chart showing the generation of a human visual system normalization array according to the present invention.

The human visual system dependent normalization array N(k) and its inverse $N^{-1}(k)$ is generated in a separate computer 42. This function may be performed by a programmed microprocessor in the transmitter and receiver. Preferrable, however, it is performed in a separate programmed digital computer, and the resulting normalization tables are permanently loaded into the transmitter and receiver at the time of manufacture. The generation of the normalization array according to the present invention will now be described with reference to FIG. 2. FIG. 2 is an overall flow chart showing the steps involved in generating the normalization array. First, the corresponding two-dimensional spatial frequencies of the DCT basis functions in cycles per degree of visual subtense is estimated (44). The estimation of the corresponding spatial frequencies requires inputs defining the DCT block size $B_x, B_y$ in the x and y directions respectively, the pixel spacing $P_x, P_y$ of the intended output display medium in the x and y directions, and the intended viewing distance V of the output image.

Figure 3:
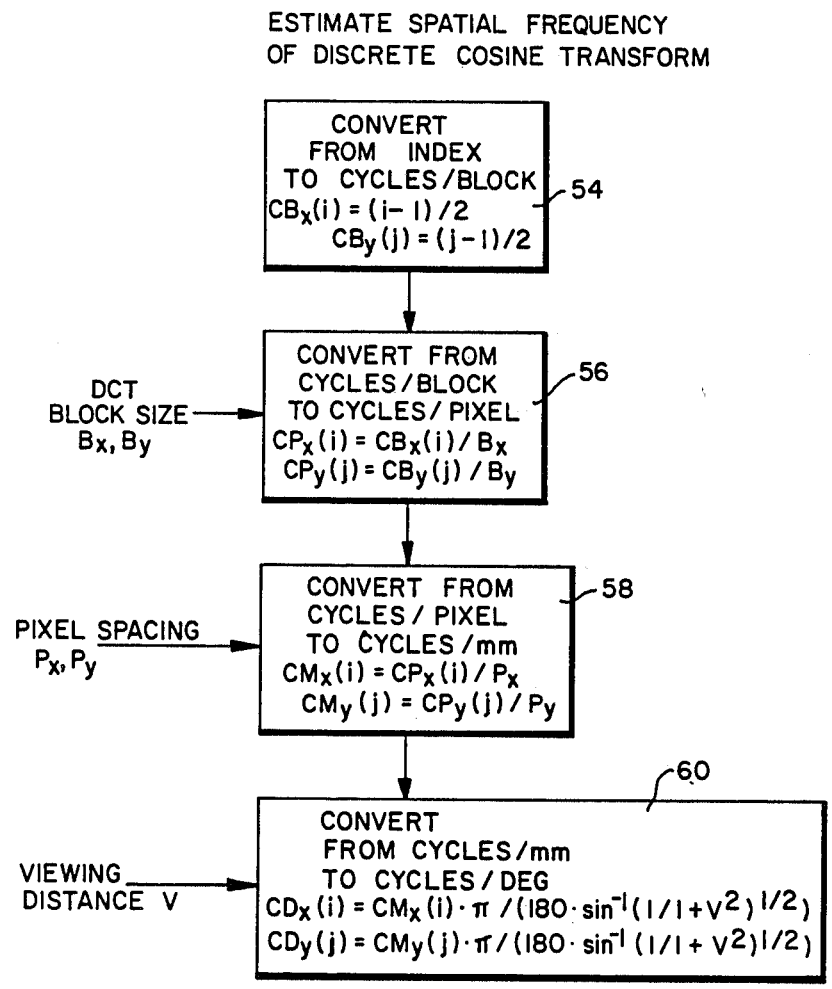
FIG. 3 is a flow chart showing a simplified technique for estimating the spatial frequencies represented by discrete cosine transform coefficients.

A two-dimensional model of the human visual system is generated (46) as described below. According to one feature of the present invention, the model of the human visual system takes into account the reduced sensitivity to diagonal spatial frequency information in the human visual system. The two-dimensional model of the human visual system and the estimate of spatial frequencies represented by the DCT basis functions are combined to generate (48) an array representing the two-dimensional sensitivity of the human visual system to the DCT basis functions. The sensitivity array is adjusted by a bit rate factor n (an overall normalization constant) to generate (50) the normalization array N(k). Finally, the normalization array N(k) is loaded into look-up tables in the transmitter/receiver. The estimation of the two-dimensional spatial frequencies represented by the DCT basis functions will now be described with reference to FIG. 3. First, cycles per block are estimated (54) from the index of the 2-D cosine transform basis functions as follows:

$$CB(i) = (i-1)/2 \quad (2)$$

$$CB(j) = (j-1)/2$$

where CB(i), CB(j) are cycles per block in the horizontal and vertical directions respectively and i and j are the indices of the basis functions in the horizontal and vertical directions respectively.

Next, using the block size for the DCT $(B_x, B_y)$ the cycles per block are converted (56) to cycles per pixel according to:

$$CP_x(i) = CB(i)/B_x \quad (3)$$

$$CP_y(j) = CB(j)/B_y$$

where $CP_x(i)$ and $CP_y(j)$ are cycles per pixel in the horizontal and vertical directions respectively. Using the pixel spacings $P_x, P_y$ in mm of the output medium, the cycles per pixels are converted (58) to cycles per mm in the output image according to:

$$CM_x(i) = CP_x(i)/P_x \quad (4)$$

$$CM_y(j) = CP_y(j)/P_y$$

where $CM_x(i)$ and $CM_y(j)$ represent cycles per mm in the horizontal and vertical directions respectively.

Finally, using the intended viewing distance V in the same units as pixel spacing, (e.g. mm), the cycles per mm are converted (60) to cycles per degree of visual subtense according to:

$$CD_x(i) = CM_x(i) \cdot \pi/(180 \sin^{-1}(1/1+V^2)^{\frac{1}{2}}) \quad (5)$$

$$CD_y(j) = CM_y(j) \cdot /(180 \sin^{-1}(1/1+V^2)^{\frac{1}{2}}) $$

where $CD_x(i)$ and $CD_y(j)$ are cycles per degree in the horizontal and vertical directons, respectively.

Figure 4:
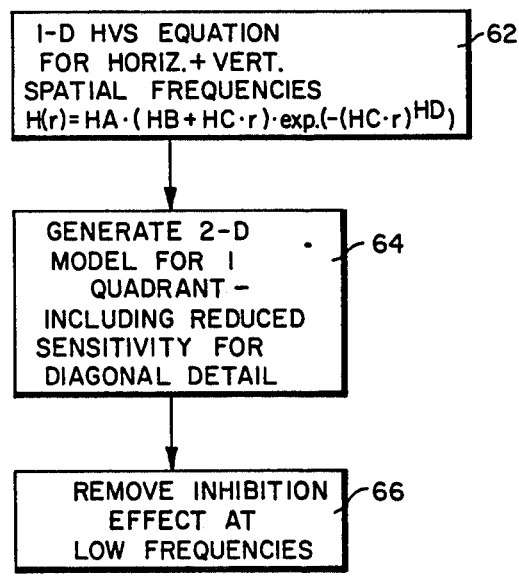
FIG. 4 is a flow chart showing the generation of a 2-D human visual system model according to the present invention.
Figure 5:
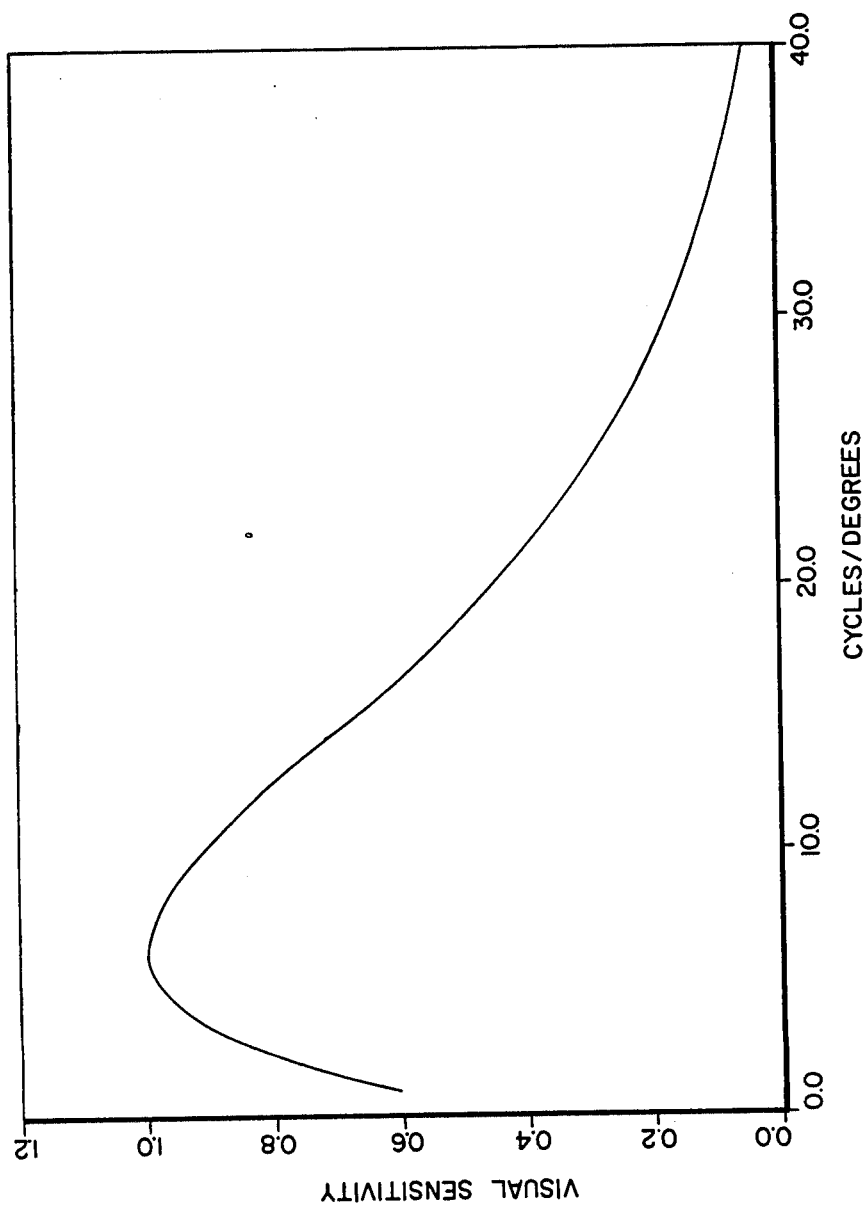
FIG. 5 is a graph showing a one-dimensional human visual system model.
Figure 6:
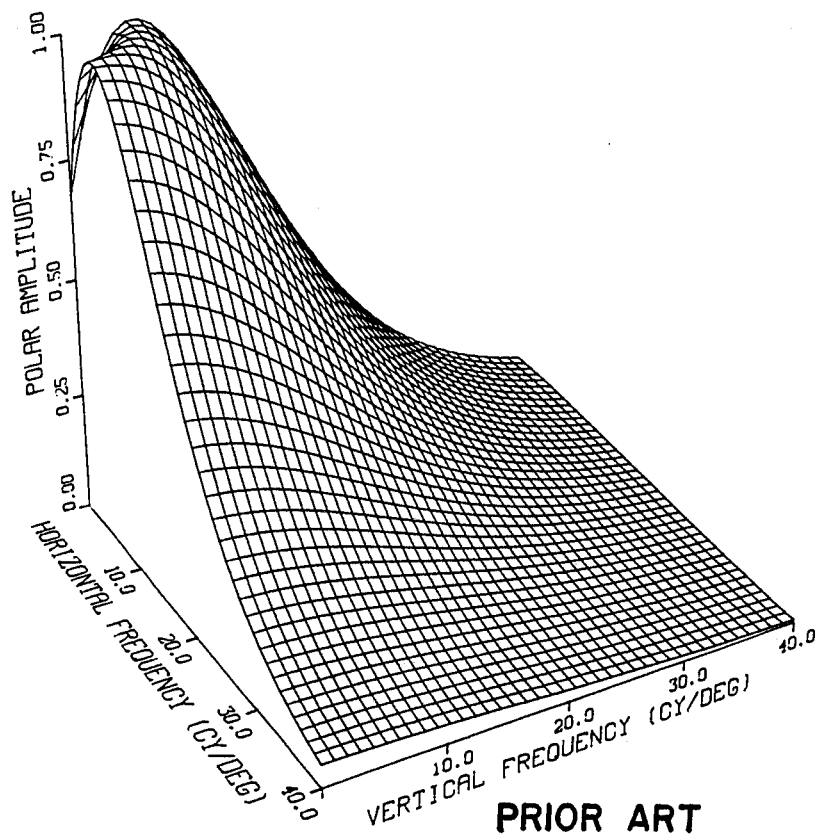
FIG. 6 is a plot of a typical prior art 2-D human visual system model developed from the one-dimensional model of FIG. 5.

The generation of the two-dimensional human visual system model according to the present invention will now be described with respect to FIGS. 4-8. Referring first to FIG. 4, the one-dimensional model for the response of the human visual system to horizontal and vertical spatial frequency information is employed (62). The model is represented as follows:

$$H(r) = HA \cdot (HB + HC \cdot r) \cdot \exp(-(HC \cdot r)^{HD}) \quad (6)$$

where $H(r)$ is the visual sensitivity normalized to 1.0 at the spatial frequency to which the human visual system is most sensitive, r is the radial spatial frequency in cycles per degree of visual subtense, HA=2.2, HB=0.192, HC=0.114 and HD=1.1. A graph of this function is shown in FIG. 5. FIG. 6 shows a two-dimensional representation of a rotationally symmetric model of the human visual system for one quadrant developed from the function shown in FIG. 5.

It is known from psycho-physical research that the bandwidth of the response of the human visual system is substantially less (about 30%) to diagonally oriented spatial frequency information than for the horizontally or vertically oriented information. The present inventors have discovered that by taking the reduced diagonal response into account in the model of the human visual system, substantial further image compression may be achieved without introducing any visible artifacts. The two-dimensional model of the human visual system with the reduced diagonal response is generated as follows. The cartesian coordinates for spatial frequencies are converted to polar coordinates as follows:

$$CR(i,j) = \sqrt{CD_x(i)^2 + CD_y(j)^2} \quad (7)$$

$$\text{Theta}(i,j) = \begin{cases} \tan^{-1}(CD_x(i)/CD_y(j)) \text{ if } CD_x(i) < CD_y(j) \\ \tan^{-1}(CD_x(i)/CD_y(j)) \text{ if } CD_y(j) < CD_x(i) \end{cases} \quad (8)$$

where $CR(i,j)$ is the radial spatial frequency of coefficient location (i,j) and $\text{Theta}(i,j)$ is the angular displacement of the coefficients orientation from the nearest cartesian coordinate axis. Since the psycho-physical studies indicate that the human visual system has about 0.7 times the bandwidth sensitivity to diagonal spatial frequency detail than to horizontal and vertical detail, a cosine function which has a value close to 0.7 at 45° was employed to shift the non-orthogonal radial spatial frequencies to higher values prior to insertion into the one-dimensional human visual system model, which employs a function of two-dimensional radial frequency to generate (64 in FIG. 4) the model from equation (7) as follows $$H(i,j) = HA \cdot (HB + HC \cdot (CR(i,j)/\cos \text{Theta}(i,j))) \cdot \exp-(HC \cdot (CR(i,j)/\cos \text{Theta}(i,j)))^{HD}. \quad (9)$$

Figure 7:
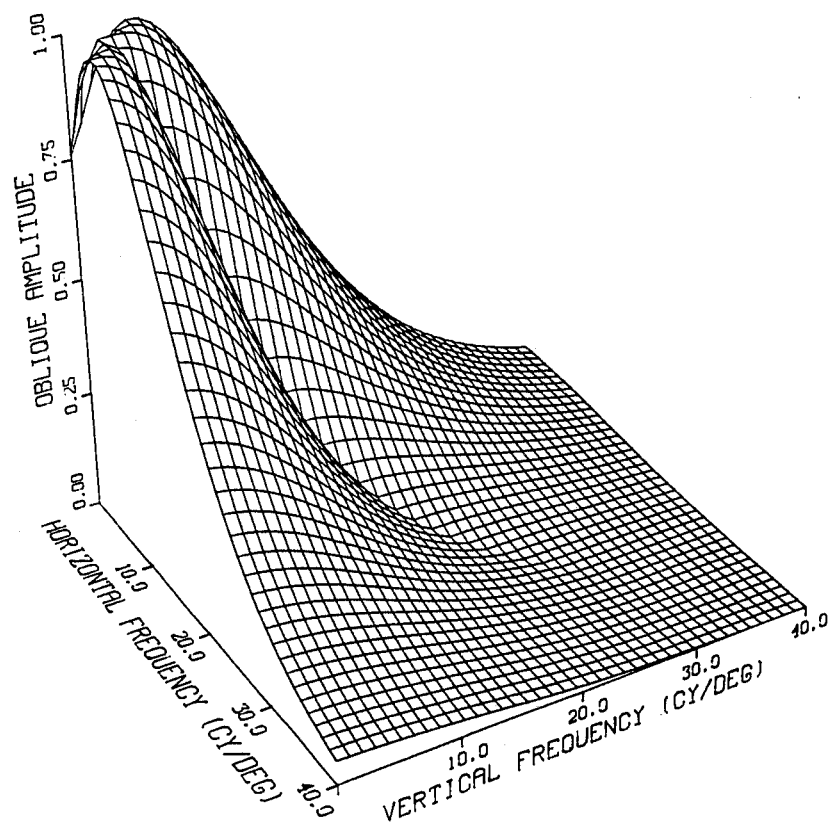
FIG. 7 is a plot of a 2-D human visual system model developed according to the present invention.
Figure 8:
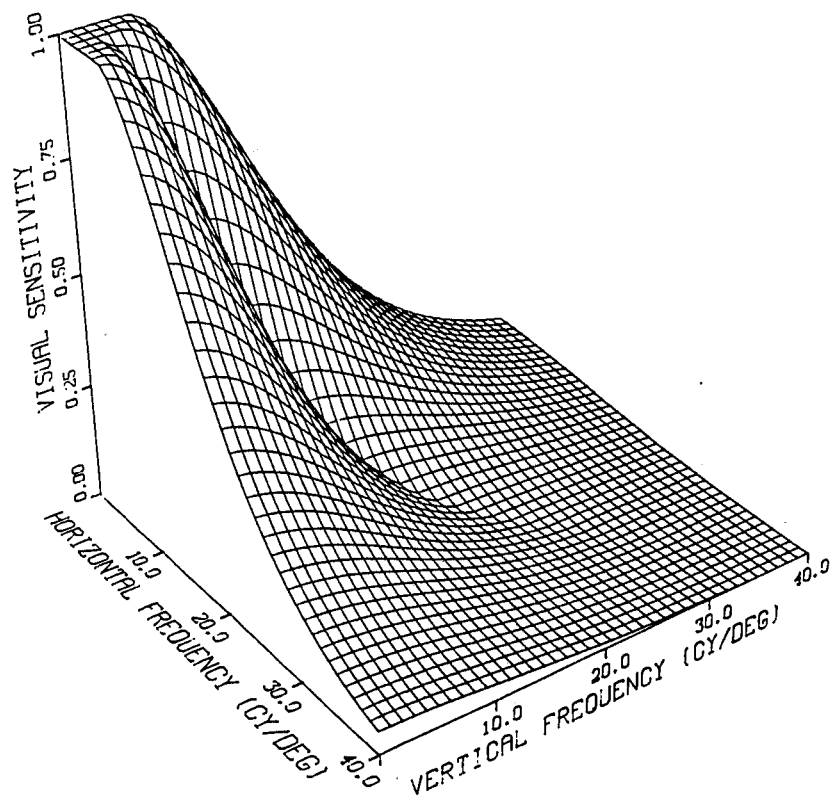
FIG. 8 is a plot showing the 2-D huamn visual system model of FIG. 7 with low frequency inhibition removed.
Figure 9:
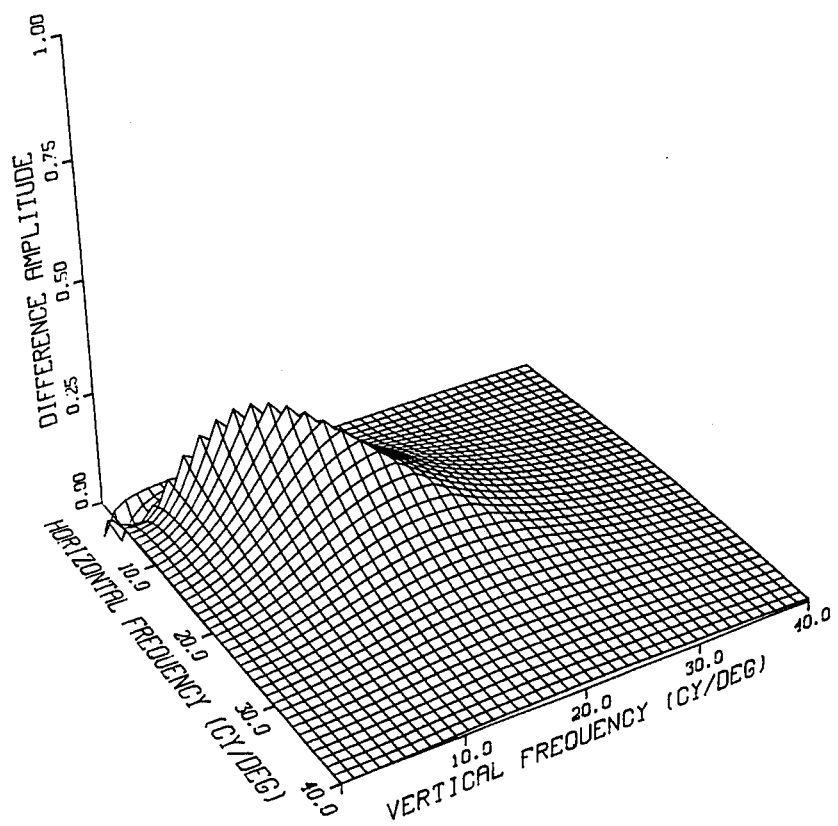
FIG. 9 is a plot of the difference between the model of the human visual system shown in FIG. 8, and the prior art model shown in FIG. 6, illustrating the greater image compression potential achievable with the present invention.

A two dimensional plot of this model is shown in FIG. 7. Furthermore, the attenuation of visual sensitivity at low frequencies, as reflected in the model shown in FIG. 7, has been discovered by the present invention to be inappropriate for block transformed images. This inhibition effect is removed from the model (66 in FIG. 4) making the model response constant from the maximum response of about 6.5 cycles per degree to zero cycles per degree. The final resulting model of the human visual system is shown in the two-dimensional plot of FIG. 8 for one quadrant. Differences between the rotationally symmetrical model of human visual sensitivity shown in FIG. 6, and the model incorporating the reduced response to diagonal detail shown in FIG. 8, are shown in FIG. 9 where positive areas indicate the degree to which the radially symmetrical model represents higher sensitivity to spatial frequencies, and negative areas vice versa. Since a higher sensitivity in spatial frequency detail requires smaller quantization steps in the DCT compression scheme, the bit rate required to transmit these frequencies will be greater. Accordingly, the positive areas in the plot of FIG. 9 indicate a potential for decreasing the bit rates while maintaining the same visual quality. Typical bit rate reductions using the human visual system model incorporating reduced sensitivity to diagonal detail have been found to be on the order of 8 to 10% higher than those achieved with the rotationally symmetrical model, with no visible change in appearance of the reproduced image.

Returning now to FIG. 2, the normalization array N(k) is generated (50) from the human visual system model as follows.

$$N(i,j) = (n/H(i,j)) - (n - N_{min}) \quad (10)$$

where $N(i,j)$ is the two-dimensional normalization array prior to being converted to a one-dimensional array of values N(k) corresponding to the conversion of the transformed coefficients to a one-dimensional array. "n" is a scaling factor that controls the overall average normalization and can be used to adjust the average bit rate of the compressed image, and $N_{min}$ is the minimum normalization value occurring when $H(i,j)=1.0$. Since the human visual system model as developed above, has a maximum value of 1.0, the minimum normalization value will take on a value of n. Depending upon the bit depth of the display and the desired degree of overall normalization n, it may be necessary to set the minimum normalization value $N_{min}$ different than n.

WORKING EXAMPLES

Figure 10:
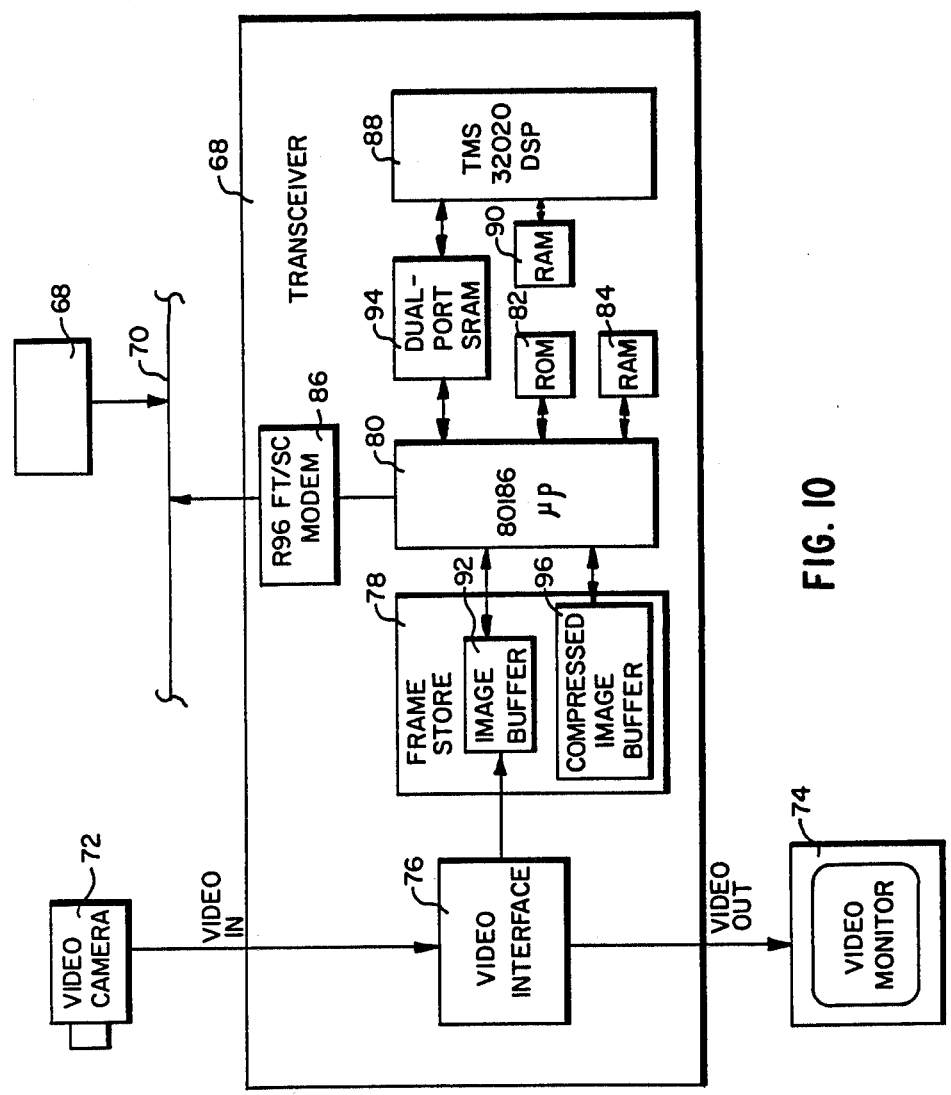
FIG. 10 is a schematic diagram showing a preferred mode of carrying out the present invention in the form of a communication system having transceivers.

Referring now to FIG. 10, a preferred implementation of the present invention in a still video communication system will be described. The system includes two or more transceivers 68 coupled to a telephone transmission line 70. Each of the transceivers 68 is connected to a video signal source such as a video camera 72, and to a video display such as a video monitor 74. Each transceiver 68 contains a standard video interface 76 that receives video signals from the video source, digitizes the signals, and supplies the digital image signals to a digital frame store 78. The video interface 76 also receives digital image signals from the digital frame store 78 and produces a standard video signal for display on the video monitor 74.

Each transceiver is controlled by an Intel 80186 microprocessor 80 having conventional ROM 82 and RAM 84 for storing the control programs and temporary storage of data respectively. The microprocessor 80 performs the run length and Huffman coding and decoding, and the human visual system dependent normalization and denormalization on the DCT coefficients. The coded DCT coefficients are sent and received over a telephone line 70 via an R96 FT/SC modem 86. The forward discrete cosine transforms DCT (in the transmitting mode) and reverse transforms (in the receiving mode) are performed by a TMS 32020 Signal Processor 88 having a conventional RAM 90 for storing the DCT transform program.

In the transmitting mode, the microprocessor 80 retrieves one 16×16 block of digital image data at a time from an image buffer 92 in the digital frame store 78. The 16×16 block of digital image data is temporarily stored in a dual port SRAM 94, that is accessible by both the microprocessor 80 and the digital signal processor 88. The digital signal processor 88 performs the discrete cosine transform and returns the 16×16 block of transform coefficients to the dual port SRAM 94. The block of transform coefficients are then normalized and compressed (Huffman and run length encoded) by the microprocessor 80. The compressed signal is stored in a compressed image buffer 96 in digital frame store 78 and sent over the telephone line 70 via modem 86. This cycle is repeated on each block until the entire image has been compressed and transmitted.

In the receiving mode, a compressed digital image is received via modem 86 and stored in compressed image buffer 96. One block at a time of compressed DCT coefficients is retrieved from the compressed image buffer 96 and denormalized and expanded by microprocessor 80. The expanded block of DCT coefficients is supplied to dual port SRAM 94. The digital signal processor 88 inversely transforms the coefficients to produce a 16×16 block of digital image values, which are temporarily stored in SRAM 94. Microprocessor 80 transfers the block of digital image values from the dual port SRAM 94 to image buffer 86. This cycle is repeated until the entire image has been received decompressed and stored in image buffer 92. The image is then displayed on the video monitor 74 via video interface 76.

A human visual system dependent normalization (denormalization) array for a 16×16 block size (i.e. $B_x=16$, $B_y=16$) and a pixel spacing of $P_x=0.535$ mm by $P_y=0.535$ mm and a viewing distance of $V=1.25$ m and $n=1$ was generated as described above on a VAX 785 mainframe computer. The resulting normalization array $N(i,j)$ prior to being converted to a one-dimensional array $N(k)$ is shown in Appendix A.

The denormalization of a decoded coefficient is accomplished by multiplying by the reciprocal of the normalization value or by dividing by the normalization value itself. The normalization/denormalization array $N(k)$ is stored in the RAM 84 associated with microprocessor 80 in the transceiver. Employing the human visual system normalization according to the present invention, bit rate reductions of 8 to 10% were noted with no visible degradation in image quality.

Although the present invention has been described with reference to a monochrome digital image, it will be readily apparent that the technique described can also be applied to a color digital image, for example by separating the image into a luminance component and a chrominance component and applying the human visual system normalization to the luminance component. Generally, since the chrominance component of a color digital image is of lower resolution than the luminance component, the gains to be made by applying the more sophisticated compression techniques of the present invention to the chrominance component do not justify the added complexity, however, the present invention have achieved excellent results in compressing color digital images by separating the images into a luminance component and two lower resolution components, and applying the block transform coding with human visual system normalization to the luminance component, and applying the block transform coding with constant normalization to the chrominance components.

INDUSTRIAL APPLICABILITY AND ADVANTAGES

The present invention is useful in systems for transmitting digital images over a limited bandwidth communication channel. It is advantageous in providing increases image compression without noticeable image degradation, thereby facilitating faster transmission times, or the use of a decreased bandwidth channel.

| APPENDIX A | | | | | | | | |
|---|---|---|---|---|---|---|---|---|
| $i=$ | $j=1$ | 2 | 3 | 4 | 5 | 6 | 7 | 8 |
| 1 | 1.00 | 1.00 | 1.00 | 1.00 | 1.00 | 1.00 | 1.00 | 1.07 |
| 2 | 1.00 | 1.00 | 1.00 | 1.00 | 1.00 | 1.00 | 1.00 | 1.07 |
| 3 | 1.00 | 1.00 | 1.00 | 1.00 | 1.00 | 1.00 | 1.00 | 1.07 |
| 4 | 1.00 | 1.00 | 1.00 | 1.00 | 1.00 | 1.00 | 1.07 | 1.07 |
| 5 | 1.00 | 1.00 | 1.00 | 1.00 | 1.07 | 1.07 | 1.15 | 1.15 |
| 6 | 1.00 | 1.00 | 1.00 | 1.00 | 1.07 | 1.22 | 1.30 | 1.30 |
| 7 | 1.00 | 1.00 | 1.00 | 1.07 | 1.15 | 1.30 | 1.45 | 1.52 |
| 8 | 1.07 | 1.07 | 1.07 | 1.07 | 1.15 | 1.30 | 1.52 | 1.82 |
| 9 | 1.07 | 1.07 | 1.15 | 1.15 | 1.22 | 1.37 | 1.52 | 1.82 |
| 10 | 1.15 | 1.15 | 1.22 | 1.22 | 1.30 | 1.45 | 1.67 | 1.89 |
| 11 | 1.22 | 1.22 | 1.30 | 1.37 | 1.45 | 1.52 | 1.75 | 1.97 |
| 12 | 1.37 | 1.37 | 1.37 | 1.45 | 1.52 | 1.67 | 1.89 | 2.12 |
| 13 | 1.45 | 1.52 | 1.52 | 1.60 | 1.67 | 1.82 | 2.04 | 2.27 |
| 14 | 1.67 | 1.67 | 1.67 | 1.75 | 1.89 | 1.97 | 2.19 | 2.49 |
| 15 | 1.82 | 1.82 | 1.89 | 1.97 | 2.04 | 2.19 | 2.42 | 2.71 |
| 16 | 2.04 | 2.04 | 2.12 | 2.19 | 2.27 | 2.42 | 2.64 | 3.01 |
| $i=$ | $j=9$ | 10 | 11 | 12 | 13 | 14 | 15 | 16 |
| 1 | 1.07 | 1.15 | 1.22 | 1.37 | 1.45 | 1.67 | 1.82 | 2.04 |
| 2 | 1.07 | 1.15 | 1.22 | 1.37 | 1.52 | 1.67 | 1.82 | 2.04 |
| 3 | 1.15 | 1.22 | 1.30 | 1.37 | 1.52 | 1.67 | 1.89 | 2.12 |
| 4 | 1.15 | 1.22 | 1.37 | 1.45 | 1.60 | 1.75 | 1.97 | 2.19 |
| 5 | 1.22 | 1.30 | 1.45 | 1.52 | 1.67 | 1.89 | 2.04 | 2.27 |
| 6 | 1.37 | 1.45 | 1.52 | 1.67 | 1.82 | 1.97 | 2.19 | 2.42 |
| 7 | 1.52 | 1.67 | 1.75 | 1.89 | 2.04 | 2.19 | 2.42 | 2.64 |
| 8 | 1.82 | 1.89 | 1.97 | 2.12 | 2.27 | 2.49 | 2.71 | 3.01 |
| 9 | 2.27 | 2.27 | 2.34 | 2.49 | 2.64 | 2.86 | 3.09 | 3.38 |
| 10 | 2.27 | 2.86 | 2.94 | 3.01 | 3.16 | 3.38 | 3.61 | 3.91 |
| 11 | 2.34 | 2.94 | 3.68 | 3.76 | 3.91 | 4.05 | 4.35 | 4.65 |
| 12 | 2.49 | 3.01 | 3.76 | 4.87 | 4.87 | 5.10 | 5.32 | 5.62 |
| 13 | 2.64 | 3.16 | 3.91 | 4.87 | 6.44 | 6.51 | 6.66 | 6.96 |
| 14 | 2.86 | 3.38 | 4.05 | 5.10 | 6.51 | 8.53 | 8.60 | 8.90 |
| 15 | 3.09 | 3.61 | 4.35 | 5.32 | 6.66 | 8.60 | 11.51 | 11.58 |
| 16 | 3.38 | 3.91 | 4.65 | 5.62 | 6.96 | 8.90 | 11.58 | 15.53 |

We claim:

1. A transmitter for compressing and transmitting a digital image over a limited bandwidth communication channel comprising:
    (a) means for performing a two-dimensional spatial frequency transformation on the digital image to produce transform coefficients; and
    (b) means for quantizing the transform coefficients in accordance with a two-dimensional model of the sensitivity of the human visual system to spatial frequencies, said model of the human visual system including the feature that the human visual system is less sensitive to diagonally oriented spatial frequencies than to horizontally or vertically oriented spatial frequencies.

2. The transmitter claimed in claim 1, wherein said means for performing a spatial frequency transformation performs a discrete cosine transformation.

3. The transmitter claimed in claim 1, wherein said means for performing a spatial frequency transformation, performs said spatial frequency transformation on subportions of the digital image, and said model of the human visual system is further modified to have constant maximum response for spatial frequencies between a frequency where the response of the human visual system is a maximum and zero cycles per degree.

4. The transmitter claimed in claim 1, wherein said means for quantizing the transform coefficients comprises;
means for normalizing the transformed coefficients in accordance with said model of the human visual system; and
a uniform quantizer for quantizing the normalized coefficients.

5. The transmitter claimed in claim 4, wherein said means for normalizing the transform coefficients comprises;
a look-up table of normalizing coefficients and means for multiplying said transform coefficients by respective normalizing coefficients.

6. A receiver for receiving and decoding a coded, compressed digital image transmitted over a limited bandwidth communication channel, comprising:
(a) means for receiving an encoded digital image signal, the encoded digital image signal comprising code words representing transform coefficients of a spatial frequency transformation of a digital image, the transform coefficients being normalized in accordance with a two-dimensional model of the sensitivity of the human visual system, said model including the feature that the human visual system is less sensitive to diagonally oriented spatial frequencies than to horizontally or vertically oriented spatial frequencies; and
(b) means for decoding the encoded digital image signal, said decoding means including means for denormalizing the values of the transform coefficients, and means for inversely transforming the denormalized transform coefficients to recover the digital image signal.

7. A transceiver for compressing, transmitting and receiving a digital image over a limited bandwidth communication channel comprising:
(a) means for performing a two-dimensional spatial frequency transformation on a digital image to produce transform coefficients;
(b) means for normalizing said transform coefficients in accordance with a two-dimensional model of the sensitivity of the human visual system to spatial frequencies, said model of the human visual system including the features that the human visual system is less sensitive to diagonally oriented spatial frequencies than to horizontally or vertically oriented spatial frequencies;
(c) means for performing the inverse of said normalizing on said normalized transform coefficients to produce denormalized transform coefficients; and
(d) means for performing the inverse of said two-dimensional spatial frequency transformation on said denormalized transform coefficients to produce a digital image signal.

8. The transceiver claimed in claim 7, wherein said means for performing a spatial frequency transformation performs a discrete cosine transform.

9. The transceiver claimed in claim 8, wherein said means for quantizing the transform coefficients comprising:
means for normalizing the transformed coefficients in accordance with said model of the human visual system; and
a uniform quantizer for quantizing the normalized coefficients.

10. The transceiver claimed in claim 9, wherein said means for normalizing the transform coefficients comprises a look-up table of normalizing coefficients and means for multiplying said transform coefficients by respective normalizing coefficients.

11. The transceiver claimed in claim 10, wherein said means for performing a spatial transformation performs said spatial frequency transformation on subportions of the digital image, and said model of the human visual system is modified to have constant maximum response for spatial frequencies between a frequency where the response of the human visual system is maximum and zero cycles per degree.

12. A system for compressing and transmitting a digital image signal over a limited bandwidth communication channel and for receiving and displaying said digital image, said display means having a characteristic pixel spacing and viewing distance, comprising:
(a) transceiver means for transmitting and receiving said digital image, said transceiver means including,
(1) means for performing a two-dimensional spatial frequency transformation on a digital image to produce transform coefficients,
(2) means for normalizing said transform coefficients in accordance with a model of the human visual system,
(3) means for denormalizing the normalized transform coefficients to produce denormalized transform coefficients; and
(4) means for performing an inverse two-dimensional spatial frequency transformation on said denormalized transform coefficients to produce a digital image, said means for normalizing and means for denormalizing including a look-up table of normalization constants, and
(b) means for generating said look-up table of normalization constants including,
(1) means for determining the two-dimensional spatial frequency components of each of said transform coefficients,
(2) means for generating a two-dimensional model of the sensitivity of the human visual system to spatial frequencies, said model of the human visual system including the feature that the human visual system is less sensitive to diagonally oriented spatial frequencies than to horizontally or vertically oriented spatial frequencies, said model generating means including scaling means for receiving signal inputs representing said characteristic pixel spacing and viewing distance and scaling said model to said signal inputs, and
(3) means for identifying a visual sensitivity value with each transform coefficient to generate said normalization constants.

13. The system claimed in claim 12, wherein said means for performing a two-dimensional spatial frequency transformation performs a discrete cosine transformation.

14. The system claimed in claim 13, whereby said means for performing a two-dimensional spatial frequency transformation performs said spatial frequency transformation on subportions of the digital image and said means for generating the two-dimensional model of the sensitivity to the human visual system generates a model having constant maximum response for low frequencies and said means for receiving signal inputs also receives inputs representing the size of said subportion.

* * * * *